(12) United States Patent
Keller, III

(10) Patent No.: US 7,515,094 B2
(45) Date of Patent: Apr. 7, 2009

(54) ADVANCED ELECTROMAGNETIC LOCATION OF ELECTRONIC EQUIPMENT

(75) Inventor: Walter J. Keller, III, Bridgeville, PA (US)

(73) Assignee: Nokomis, Inc., Charleroi, PA (US)

( * ) Notice: Subject to any disclaimer, the term of this patent is extended or adjusted under 35 U.S.C. 154(b) by 51 days.

(21) Appl. No.: 11/252,373

(22) Filed: Oct. 18, 2005

(65) Prior Publication Data

US 2006/0082488 A1 Apr. 20, 2006

Related U.S. Application Data

(60) Provisional application No. 60/619,737, filed on Oct. 18, 2004.

(51) Int. Cl.
*G01S 13/74* (2006.01)
*G01S 13/76* (2006.01)
*G01S 13/79* (2006.01)
*G01S 13/88* (2006.01)
*G01S 13/00* (2006.01)

(52) U.S. Cl. ............... 342/90; 342/13; 342/14; 342/20; 342/27; 342/89; 342/147; 342/158; 342/175; 342/195; 342/450; 342/451; 342/463

(58) Field of Classification Search ............. 342/13–20, 342/89–103, 175, 195, 27, 28, 192–194, 342/196, 197, 36–51, 59, 147, 157, 158, 342/450–465; 382/103

See application file for complete search history.

(56) References Cited

U.S. PATENT DOCUMENTS 3,732,567 A * 5/1973 Low et al. ................... 342/193
6,049,301 A * 4/2000 Weagant ...................... 342/13

* cited by examiner

*Primary Examiner*—Bernarr E Gregory
(74) *Attorney, Agent, or Firm*—James Ray & Associates

(57) ABSTRACT

An apparatus for measuring at least one of unintentional and intentional electromagnetic emissions for at least one of enabling electromagnetic location of predetermined electronic equipment giving off such at least one of such unintentional and intentional electromagnetic emissions, tagging such predetermined electronic equipment and tracking such predetermined electronic equipment and various combination thereof. The apparatus comprises an emitter mechanism for providing an amplified electromagnetic energy which at least one of amplifies and changes a frequency content of the at least one of such unintentional and intentional electromagnetic emissions signature of a targeted electronic device by using an applied electromagnetic field generated by the emitter mechanism. There is a receiver for receiving the at least one of such unintentional and intentional electromagnetic emissions signature of such targeted electronic device.

44 Claims, 7 Drawing Sheets

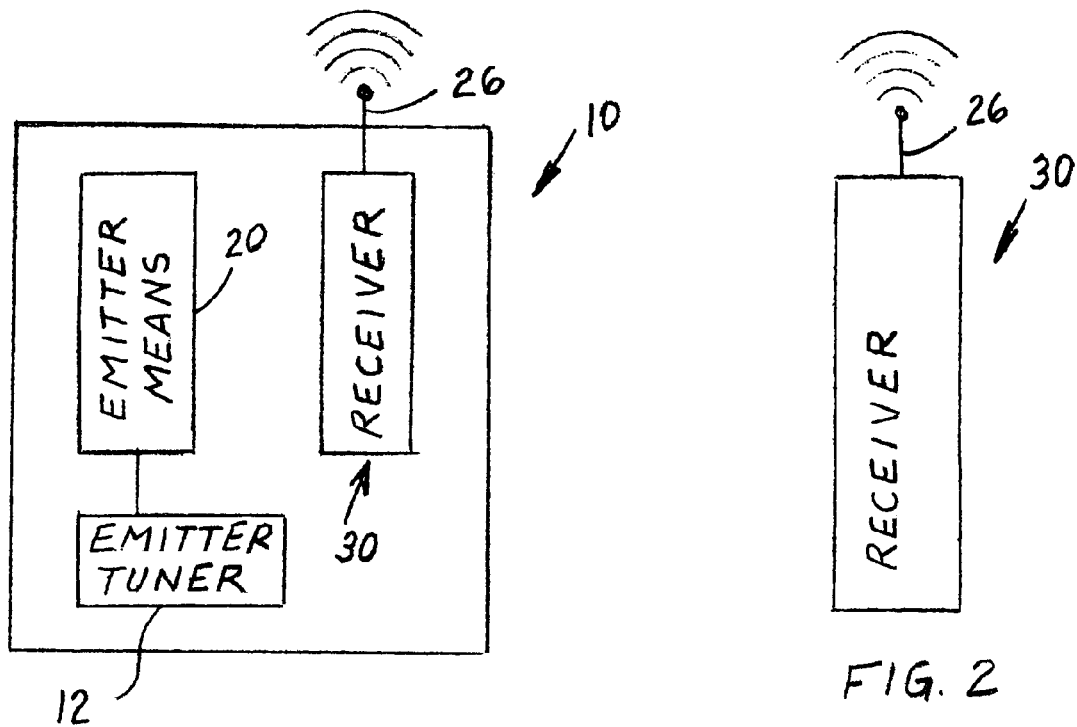
FIG. 1
FIG. 2
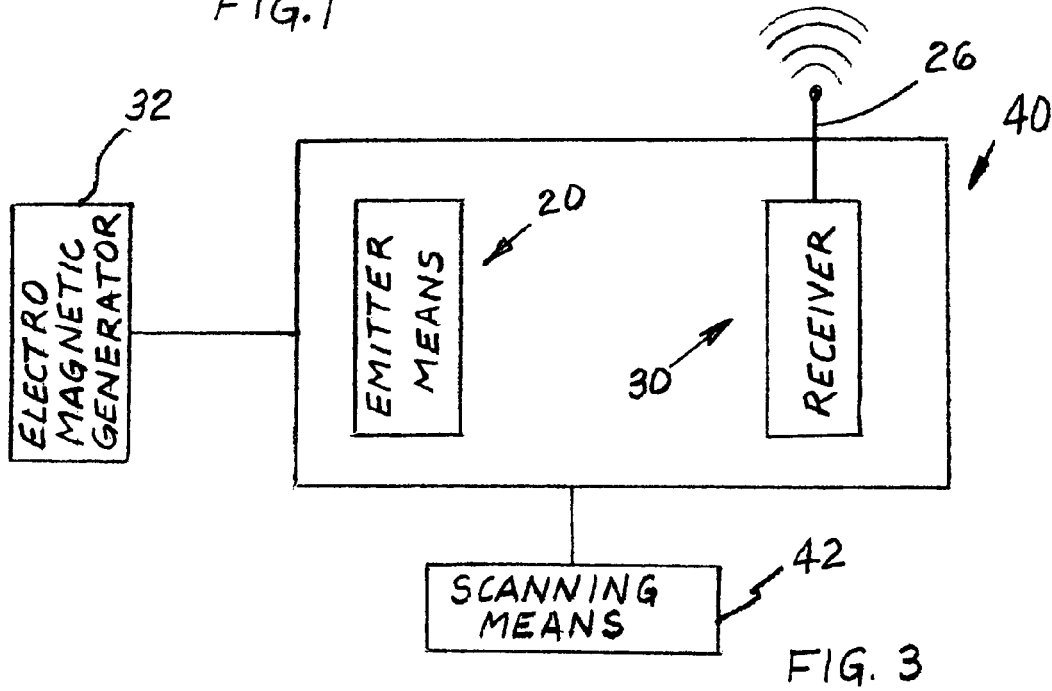
FIG. 3

ADVANCED ELECTROMAGNETIC LOCATION OF ELECTRONIC EQUIPMENT

CROSS-REFERENCE TO RELATED APPLICATION

This application is related to and claims priority from U.S. Provisional Patent Application titled "Enhanced Electromagnetic Remote Location of Electronic Equipment and Individuals who are Dependant on Electronic Equipment" filed on Oct. 18, 2004 and having Ser. No. 60/619,737.

FIELD OF THE INVENTION

The present invention relates, in general, to electronic devices and, more particularly, this invention relates to a method of and an apparatus for significantly enhancing the manner in which such electronic devices are located.

BACKGROUND OF THE INVENTION

As is well known in the prior art, electronic devices are an extremely important part of today's modern society for a number of reasons. They are used in industry to improve productivity, for example. They are also used by both industry and society, in general, as a means for communicating with one another, such as by cellular telephones and email.

Unfortunately, as is equally well known, some electronic devices can be and oftentimes are used by terrorist and/or other criminal elements for illegal purposes.

Prior to the conception and development of the present invention, it has been demonstrated that there are significant advantages to be gained by the analysis of both intentional and unintentional emissions from electronic devices to garner information about the emitting equipment, the information processed by the equipment and the location of the equipment.

For example, cellular telephone carrier frequencies can readily be utilized to determine the location of a cellular telephone or collect the information being sent via the carrier of that telephone. Wim Van Eck demonstrated the ability to measure pixels on a computer screen at a distance in 1985.

Directed Energy Weapons (DEW) have been demonstrated to be capable of impacting electronics at a substantial distance. Additionally, receiver technology has been demonstrated to be capable of measuring very low level unintended signatures from electronics. In fact the entire field of electromagnetic compatibility is built around assuring that unintentional emissions from one device do not interfere with other devices.

Doppler Radar and multi-antenna multi-location measurement approaches are the manner in which transmitting electronics are normally located.

SUMMARY OF THE INVENTION

The present invention provides an apparatus for enabling electromagnetic location of predetermined electronic equipment. The apparatus comprises an emitter means for providing an amplified electromagnetic energy which amplifies at least one of an unintentional and an intentional electromagnetic emissions signature of a targeted electronic device by using an applied electromagnetic field generated by such emitter and a receiver means for receiving such at least one of such unintentional and intentional electromagnetic emissions signature of such targeted electronic device.

This invention, in another aspect, provides a measuring apparatus for gathering information with respect to at least one of contents and persons in a building. In this embodiment, the measuring apparatus includes a receiver for tracking a known characteristic signature of a predetermined electronic component possessed by an individual. There is also an emitter means for causing such characteristic signature being tracked to change thereby enabling such information with respect to at least one of such contents and persons in such building to be gathered. A portable high power Radio Frequency (RF) generator is provided for generating a signal and there is a means engageable with such emitter means for scanning the emitter 360 degrees to facilitate locating such predetermined electronic component.

According to another aspect the present invention provides a method for locating predetermined electronic equipment comprising the steps of first providing a receiver for receiving an at least one of an unintentional and an intentional electromagnetic emissions signature of a targeted electronic device and an emitter means for providing an amplified electromagnetic energy and amplifying an unintentional electromagnetic emissions signature of such targeted electronic device by using an applied electromagnet field generated by such emitter means.

Additionally, the present invention provides a method for locating predetermined electronic equipment. The method includes the steps of providing a receiver for receiving an at least one of an unintentional and an intentional electromagnetic emissions signature of a targeted electronic device and an emitter means for providing an amplified electromagnetic energy and amplifying such at least one of such unintentional and such intentional electromagnetic emissions signature of such targeted electronic device by using an applied electromagnet field generated by such emitter means. The emitter when utilized specific to the frequency content of unintentional electromagnetic emissions can be utilized to shift specific frequency characteristics of such unintentional electromagnetic emissions.

OBJECTS OF THE INVENTION

It is, therefore, one of the primary objects of the present invention to provide a method of and an apparatus for locating, tagging, tracking and debilitating preselected electronic devices at a predetermined distance.

An additional highly significant object of the present invention is to provide a method of and an apparatus which in the case of Improvised Explosive Devices (IEDs) an operator will be able to force the detonation of the IED by applying energy at the emissions frequencies of the ICs, or oscillators, that keep the device operating by increasing the power through pulse applications or short CW bursts the operator will be able to tag the device by inducing energy into a semiconductor that minimally exceeds the breakdown characteristics of the device.

Another object of the present invention is to provide a method of and an apparatus for leveraging the use of unintentional signatures given off by substantially all electronics to enhance both the direction and range finding of electronics, the tagging of electronics and the debilitation of electronics.

Still another object of the present invention is to provide a method of and an apparatus for utilizing passive measurement of the RF and microwave spectrum given off unintentionally by electronic devices which can be leveraged to locate electronic devices.

Yet another object of the present invention is to provide a method of and an apparatus for measuring a characteristic signature of such electronic device and using such characteristic signature like a fingerprint to identify such electronic device.

A further object of the present invention is to provide a method of and an apparatus for determining characteristics by individual emissions of oscillators and semiconductors on the component level, board layout and circuit design on the board level, enclosure and cabling characteristics on the device level and network interconnectivity on the network level.

An additional object of the present invention is to provide a method of and an apparatus which by measuring a signature the gross location of the source of the emission and thereby the electronics that is giving off the emissions can be determined.

Still a further object of the present invention is to provide a method of and an apparatus which by analyzing the emissions signature the emission signature can be leveraged further through the introduction of RF, or microwave energy, that corresponds in certain ways to the emissions signature.

Yet still another object of the present invention is to provide a method of and an apparatus such that when oscillators are the emission source for one spectral component of the signature it is possible to perturb the oscillator's emissions signature by illuminating the device with RF or microwave at the same frequency or at the frequency of its harmonics and in this manner as the secondary source is scanned across the device the signature change can be used to precisely locate the device with more accuracy than current direction and range finding technology including the illumination of the emissions of semiconductors as well and which may in many cases actually be leveraged to a greater extent.

It is a still further object of the present invention to provide a method of and an apparatus in which in addition to being able to do direction and range finding better, the simple perturbation of the signature verifies the ability to impact the target.

Another object of the present invention is to provide a method of and an apparatus wherein energy that has been effectively collected via unintentional paths by the target is significant as it has identified an efficient frequency for further operations with respect to the targeted device.

Yet still another object of the present invention is to provide a method of and an apparatus which will allow the owner of a cellular telephone to be located rapidly.

A further object of the present invention is to provide a method of and an apparatus which will enable law enforcement officers to at least one of more quickly locate, tag or track a laptop or PDA being used by an individual.

In addition to the numerous objects and advantages of the present invention which have been described in detail above, various other objects and advantages of the present invention will become more readily apparent to those persons who are skilled in the relevant art from the following more detailed description of the invention, particularly, when such description is taken in conjunction with the attached drawing figures and with the appended claims.

BRIEF DESCRIPTION OF THE DRAWINGS

FIG. 1 is a schematic illustration of one form of the present invention;

FIG. 2 is a schematic illustration of a receiver used in the present invention;

FIG. 3 is a schematic illustration of a presently preferred embodiment of the invention;

Figure 4:
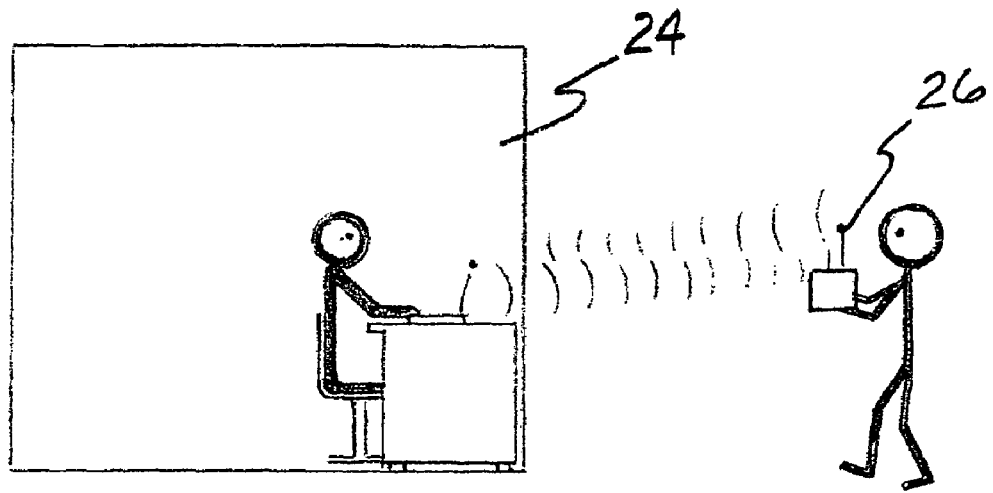
FIG. 4 is a schematic illustration of using the invention in a portable configuration.
Figure 5:
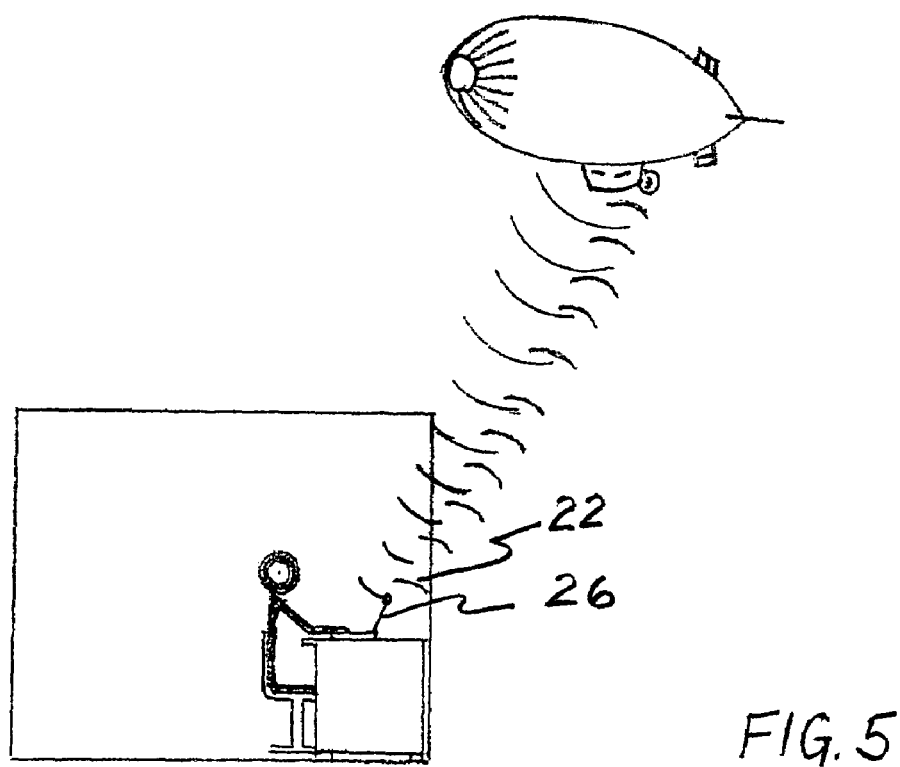
FIG. 5 is a schematic illustration of using the invention in which the receiver and transmitter are located on the same platform.
Figure 6:
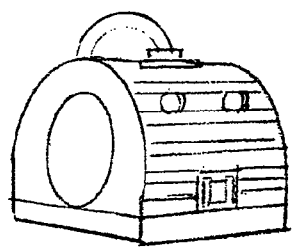
FIG. 6 is an illustration of a typical high power BWO type microwave RF source.
Figure 7:
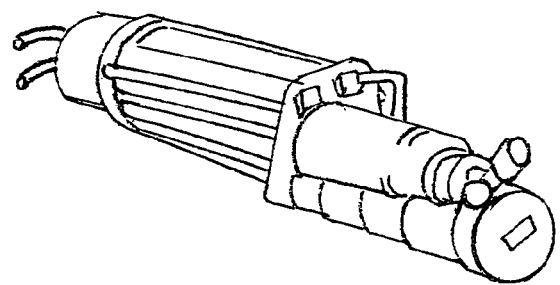
FIG. 7 is an illustration of a typical high power Klystron type microwave RF source.
Figure 8:
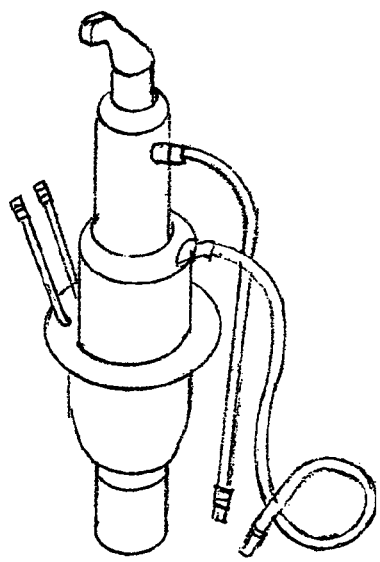
FIG. 8 is an illustration of a typical high power Magnetron type microwave RF source.
Figure 9:
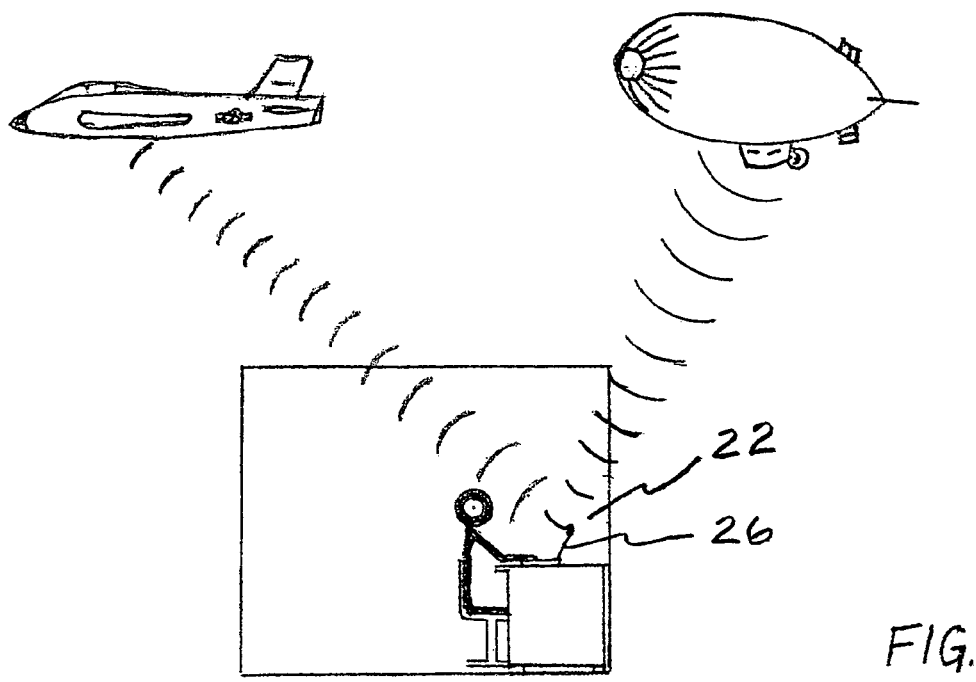
FIG. 9 is a schematic illustration of using the invention in which the receiver and transmitter are located on separate platforms.
Figure 10:
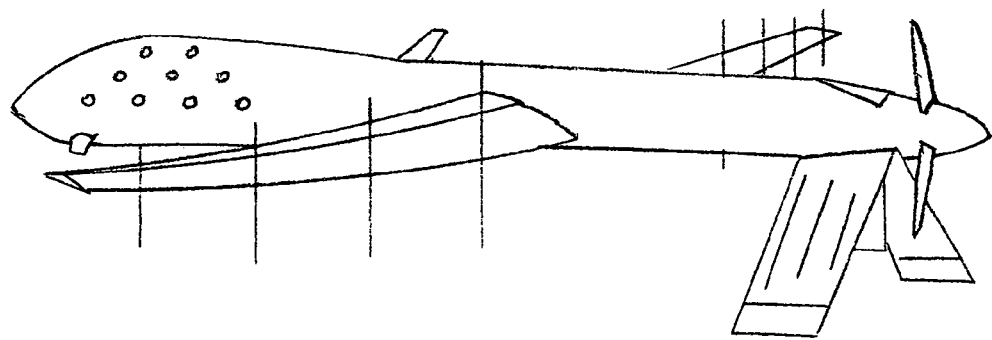
FIG. 10 is a schematic illustration depicting a UAV with several different antenna types that achieve broadband coverage for the receiver and transmitter.
Figure 11:
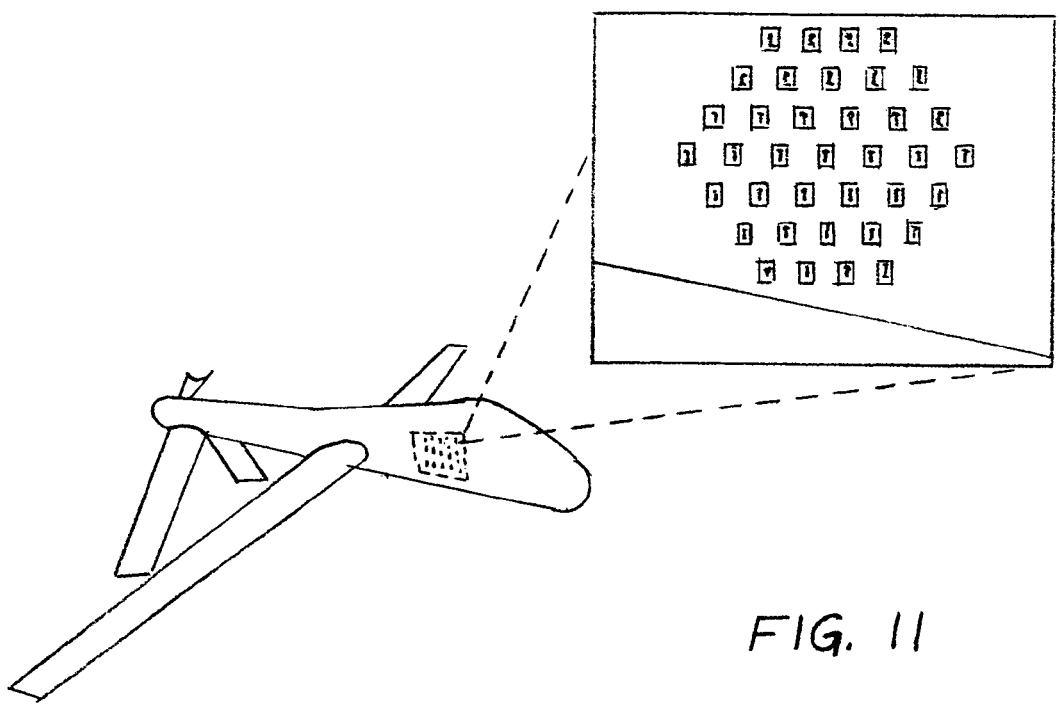
FIG. 11 is a schematic illustration of a UAV showing a conformal array of antennas that yield broadband coverage for the measurement and perturbation of emissions products.
Figure 12:
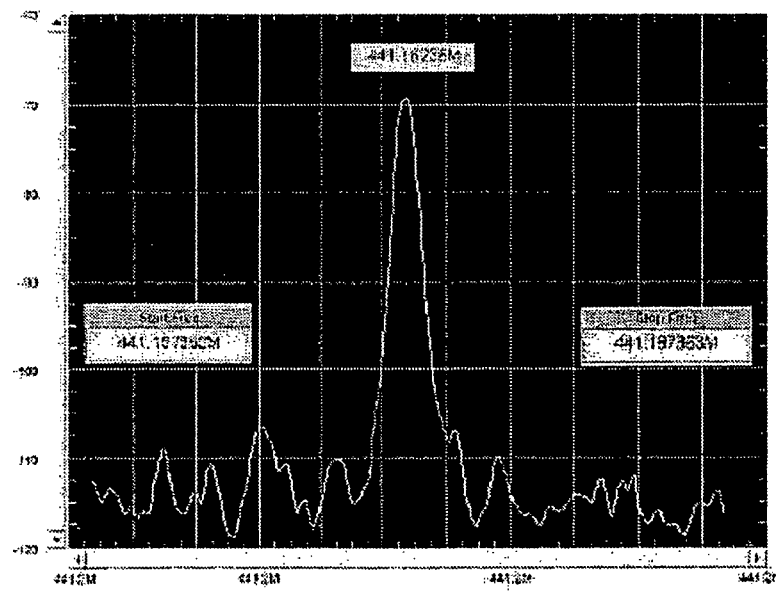
FIG. 12 is a graph illustrating concerning the invention.
Figure 13:
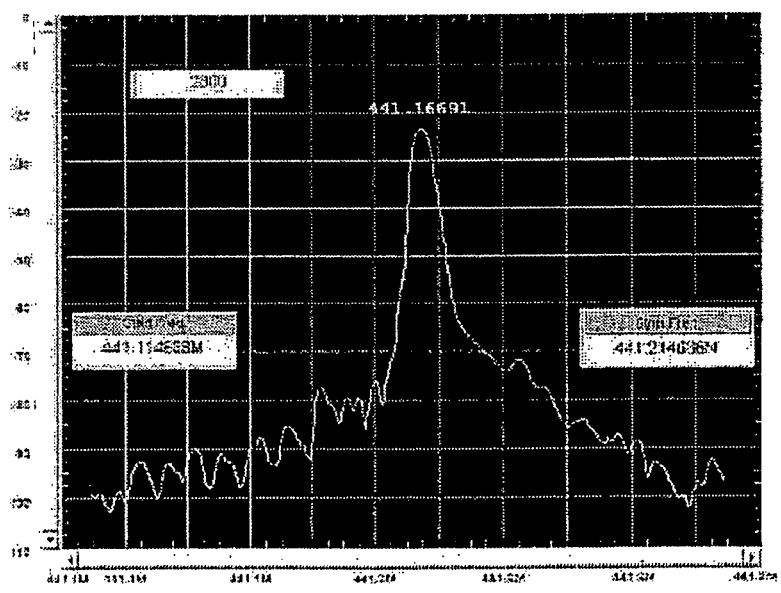
FIG. 13 is a graph illustrating concerning the invention.
Figure 14:
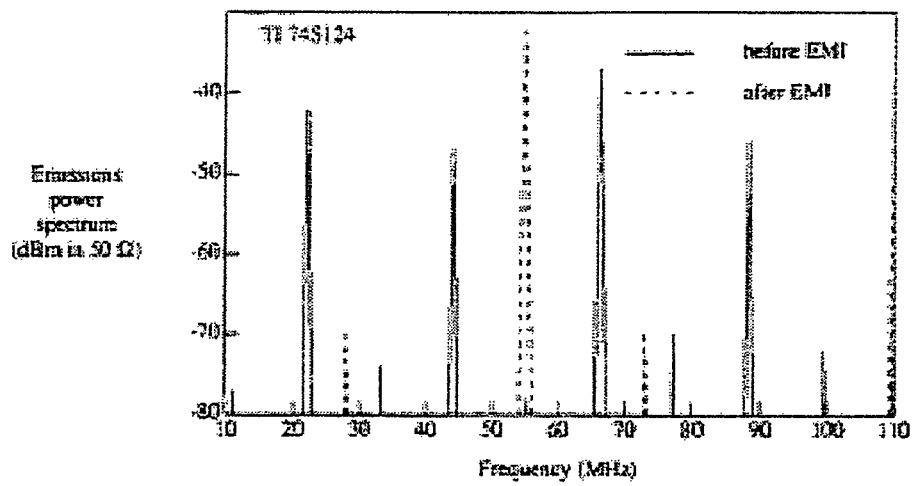
FIG. 14 is a graph illustrating concerning the invention.
Figure 15:
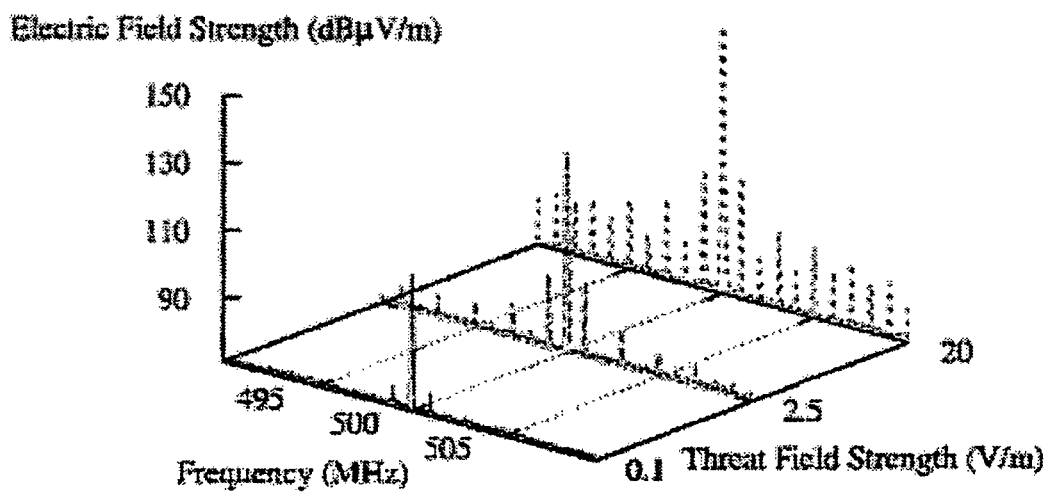
FIG. 15 is a diagram illustrating electric field strength (dBuV/M) verses threat field strength.

BRIEF DESCRIPTION OF A PRESENTLY PREFERRED AND VARIOUS ALTERNATIVE EMBODIMENTS OF THE INVENTION

Prior to proceeding to the more detailed description of the invention it should be noted that identical components which have identical functions have been designated with identical reference numerals throughout the several views illustrated in the drawings for the sake of clarity.

Now refer more particularly to FIGS. 1 and 2 of the drawings. Illustrated therein is an apparatus, generally designated 10, for measuring at least one of unintentional and intentional electromagnetic emissions for at least one of enabling electromagnetic location of predetermined electronic equipment giving off such at least one of unintentional and intentional electromagnetic emissions, tagging such predetermined electronic equipment and tracking such predetermined electronic equipment and various combination thereof. Apparatus 10 includes an emitter means 20 for providing an amplified electromagnetic energy which at least one of amplifies and changes a frequency content of the at least one of such unintentional and intentional electromagnetic emissions signature of a targeted electronic device by using an applied electromagnetic field generated by the emitter 20. There is a receiver 30 provided in the apparatus 10 for receiving the at least one of such unintentional and intentional electromagnetic emissions signature of such targeted electronic device.

In apparatus 10 the applied electromagnetic field generated by emitter 20 is at least one of in a form of a microwave source, high power microwaves, pulsed high power microwaves, a non-nuclear electromagnetic pulse, a radio frequency source, a pulsed radio frequency source, a millimeter source and radar.

In one presently preferred embodiment, such emitter means 20 further includes means 14 for utilizing amplification of the emission signatures of such targeted electronic device through semiconductor component degradation to at least one of locate, tag and track such targeted electronic device emitting equipment.

Additionally, according to one embodiment of the invention the semiconductor component degradation is accomplished by an external RF energy.

When the field strengths necessary to cause a desired response are insufficient to cause at least one of circuit degradation and failure the apparatus 10 further includes a means, generally designated 12, electrically connected to such emitter means 20 for enabling lower field strengths with specific intents to be used to alter at least one circuit function. In this manner, it will substantially cause emissions that adequately provide an emission signature that is at least sufficient to at least one of locate, tag and track such predetermined electronic equipment. Such predetermined electronic equipment is at least one of an oscillator, a voltage control oscillator, a ceramic resonator, a local oscillator, and a stable local oscillator. Further, means 12 is electrically connected to the emitter means 20 for enabling lower field strengths with specific intents to be used to alter at least one circuit function affects a clock (not shown) in such predetermined electronic equipment.

In the presently preferred embodiment of the invention, such means 12 electrically connected to the emitter means 20 for enabling lower field strengths with specific intents to be used to alter at least one circuit function affects such clock in such predetermined electronic equipment by coupling it to at least one of such clock's ground and to output traces of such clock or the harmonics. It is likewise possible in the present invention to affect the harmonic content of a switching power supply.

In the apparatus 10, the receiver 30 samples electromagnetic emissions of such predetermined electronic equipment and such emitter means 20 emits energy at frequencies selected based on anticipated characteristics of such predetermined electronic equipment. Such frequencies correspond to such clocks of such predetermined electronic equipment.

Alternatively, the means 12 electrically connected to the emitter means 20 for enabling lower field strengths with specific intents to be used to alter at least one circuit function affects a semiconductor in such predetermined electronic equipment by coupling it to at least one of a ground and to output traces of such semiconductor.

Reference is now made, more particularly, to FIG. 3. Shown therein is an alternative embodiment of the invention in which there is a measuring apparatus 40 for gathering information with respect to at least one of contents and persons in a building. Such measuring apparatus 40 includes a receiver 30 for tracking a known characteristic signature of a predetermined electronic component possessed by an individual. Measuring apparatus 40 also includes an emitter means 20 for causing such characteristic signature being tracked to change thereby enabling such information with respect to at least one of such contents and persons in such building to be gathered.

A portable high power electromagnetic generator 32 is provided for generating a signal and a means 42 is engageable with the emitter means 20 for scanning the emitter means over a 360 degree range and to facilitate locating such predetermined electronic component.

In this embodiment of the invention, the emitter 20 can remotely located while still amplifying an electromagnetic emissions characteristic signal so that the receiver 30 can locate such predetermined electronic component. Alternatively, such receiver 30 can use electromagnetic sources focused on a targeted predetermined electronic component to amplify the characteristic signal. Additionally, such at least one of the receiver 30 and such emitter means 20 can be disposed for aerial surveillance.

In yet another alternative embodiment, such emitter means 20 may be positioned on at least one of a platform 22 located in outer space, land and water.

According to the present invention, it is also possible for such emitter means 20 to be positioned on a platform 24 located in outer space. In this embodiment, the apparatus 10 measures an unintentional emission signature of substantially an entire landscape before and after firing of at least one of a directed energy and a radiation type weapon to locate specific emissions signature changes to provide information about equipment at a particular location. In a presently preferred embodiment of this arrangement, such platform 24 is a high power microwave platform. Further, such measuring apparatus 40 is disposed at a predetermined distance from such weapon to at least one of prevent failure and upset of measuring apparatus 40 and to allow continuous monitoring of a measured landscape.

In the present invention, the predetermined electronic components emissions may be one of a same, a multiple of and a sub multiple of a frequency of an electromagnetic energy of the emitter 20. It is presently preferred that such predetermined electronic components emissions are of a broadband type.

An electromagnetic energy of the emitter 20 is at least one of tuned to and amplifies electromagnetic emissions of such predetermined electronic component by an applied electromagnetic field generated by emitter 20.

The present invention further contemplates an improved method for locating predetermined electronic equipment which includes the steps of providing a receiver for receiving an unintentional electromagnetic emissions signature of a targeted electronic device and an emitter means for providing an amplified electromagnetic energy. The final essential step in this method is at least one of amplifying at least one of an unintentional and an intentional electromagnetic emissions signature of such targeted electronic device by using an applied electromagnetic field generated by such emitter means and shifting a frequency of the at least one of such unintentional and intentional electromagnetic emissions. In the presently preferred embodiment of the method includes measuring an unintentional electromagnetic radiation of such targeted electronic device and directing electromagnetic energy at such targeted electronic device at tunable levels in order to locate such targeted electronic device precisely and the further step of causing at least one of incrementally more degradation and failure of such targeted electronic device.

For improving accuracy of the method it includes the additional step of causing such targeted electronic device to emit electromagnetic radiation which enables at least one of better tracking, locating, eavesdropping and causing failure of such targeted electronic device.

Such method may also include the additional step of using RF energy from at least one of an RF and a microwave source for enhancing ability to establish characteristics of an emissions source in conjunction with an active high power RF that drives emission signature changes.

The method can further include an additional step of causing changes in emission signatures in order to impact remotely such targeted electronic devices.

According to the present method it further includes the additional step of measuring a level of field strength necessary to impact such targeted electronic device for use in deciding to use other assets to learn more about said emitter.

The method can include the additional step of tuning a source of such emission signatures of such targeted electronic device to enable measuring a relative distance of such targeted electronic device from at least one of the receiver and such source.

In the presently preferred method of the invention, it includes the additional step of measuring a direction of such emission signatures of such targeted electronic device by sweeping such source across at least one of a number of degrees and radians for measuring a direction of such targeted electronic device from at least one of the receiver and such source.

The method also contemplates using an additional step of rapidly transforming a source of such characteristic signature into a relatively robust emitter to aid in at least one of tracking and locating such targeted electronic device.

The additional step of using integrated passive emission collection techniques and at least one of offensive RF weapons, radar and jammers for at least one of locating and tracking individuals dependant on predetermined electronic devices is also possible using this method or the additional steps of cataloging in a database at least one of specific degradation signatures of different types of equipment and circuit components failure signatures and comparing such equipment signature change for at least one of locating and tracking such equipment.

Such method may additionally include the additional step of permanently altering at least one of an amplitude and a frequency characteristic of such unintentional electromagnetic emissions signature such that such electronic equipment is tagged for future inspection.

In summary, by showing the ability to perturb the device the operator will know how to perturb the device. As evidenced by the Wunsch-Bell model semiconductors do not fail all at once. First there are microscopic molten areas that form across the junction. As the energy dissipates the molten area solidifies forming a microscopic conductive region across the semiconductor junction. This region changes the impedance of the device and likewise the emission signature of the device. The change in signature can be used to electromagnetically tag electronics at a distance.

Finally, since the use of this method reveals the frequencies where energy most efficiently enters a device at a distance it becomes obvious the frequency or frequencies that are most efficient to deploy directed energy weapons technology of the high power RF or high power microwave variety.

In the manner described the use of RF and microwave unintentional emissions signature when leveraged using active RF and microwave sources that correspond appropriately with properties of the emissions signature electronic devices can be located, remotely actuated, tagged and debilitated with enhanced efficiency.

The invention in the preferred embodiment will consist of a super sensitive receiver 30 integrated with processors power supplies and all the necessary electronics to appropriately receive the emissions signature, an antenna 26 or several antennas 26 that yield tunable broadband functionality for receiving and transmitting and a high power RF/microwave source preferably of directed energy capability.

The receiver 30 in its preferred embodiment will be as small as possible. It will consist of a housing that has I/O and power connections to antennas, transmitting sources and power sources. It will have a backplane into, which plugs several cards the most likely of which will be one or more processor cards as well as receiver cards and possible several channelized receivers as well as power supply cards a fan for thermal conditioning and miscellaneous electronics as necessary for the receiving system. This system must be sensitive enough to differentiate low level signals from the noise and hence noise control and filtering are critical to the design.

The antenna 26 in its preferred embodiment will be a broadband array of small element antennas 26 that are connected to form an array. As the receiver 30 scans across each of the elements the more narrowband nature of each element will act as a filter to aid in noise control.

The preferred source will be of extremely high power that is tunable over a broad range of power levels and broadband across the frequency range from 1 MHz to 3 GHz. In lieu of a single tunable source several sources may be utilized to function simultaneously.

The receiver 30 system and transmitter 20 will be integrated to form a small compact package that is mountable on numerous air and ground vehicles. Lower power proximity devices will be man portable.

While in accordance with the patent statutes a presently preferred as well as a number of alternative embodiments of the invention have been described in considerable detail above, it should be obvious that various alterations and other modifications can be envisioned by those persons who are skilled in the relevant art without departing from either the spirit of the invention or the scope of the appended claims.

I claim:

1. An apparatus for measuring at least one of an unintentional electromagnetic emissions signature and an intentional electromagnetic emissions signature for at least one of enabling electromagnetic location of predetermined electronic equipment giving off said at least one of said unintentional electromagnetic emissions signature and said intentional electromagnetic emissions signature, at least one of tagging such predetermined electronic equipment by increasing power incident thereto, identifying such predetermined electronic equipment and tracking such predetermined electronic equipment and a combination thereof, said apparatus comprising:

(a) an emitter means for causing at least one a changed frequency content and amplification of said at least one of said unintentional electromagnetic emissions signature and said intentional electromagnetic emissions signature of a targeted electronic device by said emitter means providing an amplified electromagnetic energy to generate an applied electromagnetic field, and said emitter means further for at least one of enabling location of such targeted electronic device, tagging such targeted electronic device by increasing power incident thereto, identifying such targeted electronic device, and tracking such targeted electronic device; and (b) a receiver for measuring said at least one of said unintentional electromagnetic emissions signature and said intentional electromagnetic emissions signature for at least one of said location, tagging, identifying, and tracking of such targeted electronic device.

2. An apparatus, according to claim 1, wherein said applied electromagnetic field generated by said emitter means is at least one of in a form of a microwave source, high power microwaves, pulsed high power microwaves, a non-nuclear electromagnetic pulse, a radio frequency source, a pulsed radio frequency source, a millimeter source and radar.

3. An apparatus, according to claim 1, wherein said emitter means further includes means for utilizing amplification of said emission signatures of such targeted electronic device through semiconductor component degradation to said at least one of locate, tag, identify and track such targeted electronic device emitting equipment.

4. An apparatus, according to claim 3, wherein said semiconductor component degradation is accomplished by an external RF energy.

5. An apparatus, according to claim 1, wherein field strengths necessary to cause a desired response is insufficient to cause at least one of circuit degradation and failure and said apparatus further includes a means electrically connected to said emitter means for enabling lower field strengths with specific intents to be used to alter at least one circuit function thereby substantially causing emissions that adequately provide an emission signature that is at least sufficient to at least one of locate, identify and track such predetermined electronic equipment.

6. An apparatus, according to claim 5, wherein such predetermined electronic equipment contains at least one of an oscillator, a voltage control oscillator, a ceramic resonator, a local oscillator, and a stable local oscillator.

7. An apparatus, according to claim 5, wherein said means electrically connected to said emitter means for enabling lower field strengths with specific intents to be used to alter at least one circuit function affects a clock in such predetermined electronic equipment.

8. An apparatus, according to claim 7, wherein said clock harmonics are affected.

9. An apparatus, according to claim 5, wherein said means electrically connected to said emitter means for enabling lower field strengths with specific intents to be used to alter at least one circuit function affects a clock in such predetermined electronic equipment by coupling to at least one of such clock's ground and to output traces of such clock.

10. An apparatus, according to claim 9, wherein said receiver samples electromagnetic emissions of such predetermined electronic equipment and said emitter means emits energy at frequencies selected based on anticipated characteristics of such predetermined electronic equipment.

11. An apparatus, according to claim 9, wherein said frequencies correspond to such clocks of such predetermined electronic equipment.

12. An apparatus, according to claim 5, wherein said means electrically connected to said emitter means for enabling lower field strengths with specific intents to be used to alter at least one circuit function affects a semiconductor in such predetermined electronic equipment by coupling to at least one of a ground and to output traces of such semiconductor.

13. An apparatus, according to claim 5, wherein said apparatus affects a harmonic content of a switching power supply.

14. An apparatus, according to claim 5, wherein said apparatus affects a harmonic content of a semiconductor device.

15. A measuring apparatus, according to claim 1, wherein said predetermined electronic components emissions are one of at a same, multiple and sub multiple of a frequency of an electromagnetic energy of said emitter.

16. A measuring apparatus, according to claim 1, wherein said predetermined electronic components emissions are broadband.

17. A measuring apparatus, according to claim 1, wherein an electromagnetic energy of said emitter is at least one of tuned to and amplify electromagnetic emissions of such predetermined electronic component by an applied electromagnetic field generated by said emitter.

18. An apparatus, according to claim 1, wherein such targeted device emissions signature received by said receiver is used specifically to tune said emitter to frequencies contained within such targeted device emissions signature to facilitate more efficient coupling of electromagnetic energy into electronics of such targeted device.

19. An apparatus, according to claim 18, wherein said emitter means impacts such targeted electronics device.

20. An apparatus, according to claim 18, wherein said emitter means causes a failure of said targeted electronics device.

21. An apparatus, according to claim 18, wherein said emitter means causes at least one of a failure of such targeted electronics device being used as an Improvised Explosive Device (IED) trigger and at least one of tagging, location, identification and tracking of such targeted electronics device being used as an Improvised Explosive Device (IED) trigger.

22. A measuring apparatus for obtaining information with respect to at least one of contents and persons in a building, said measuring apparatus comprising:
(a) a receiver for tracking a known characteristic signature of a predetermined electronic component possessed by an individual;
(b) an emitter means for causing said characteristic signature being tracked to change thereby enabling such information with respect to said at least one of such contents and such persons in such building to be obtained;
(c) a portable high power electromagnetic generator for generating a signal; and
(d) means engageable with said emitter means for scanning said emitter 360 degrees and facilitating locating such predetermined electronic component.

23. A measuring apparatus, according to claim 22, wherein said emitter means is remotely located and amplifies an electromagnetic emissions characteristic signal so that said receiver will locate such predetermined electronic component.

24. A measuring apparatus, according to claim 23, wherein said emitter means is positioned on at least one of a platform located in outer space, land and water.

25. A measuring apparatus, according to claim 24, wherein said emitter means is positioned on said platform located in outer space and said apparatus measures an unintentional emission signature of substantially an entire landscape before and after firing of at least one of a directed energy and a radiation type weapon to locate specific emissions signature changes to provide information about equipment at a particular location.

26. A measuring apparatus, according to claim 25, wherein said measuring apparatus is disposed at a predetermined distance from said weapon to at least one of prevent failure and upset of said measuring apparatus and allow continuous monitoring of a measured landscape.

27. A measuring apparatus, according to claim 24, wherein said platform is a high power microwave platform.

28. A measuring apparatus, according to claim 22, wherein said receiver utilizes electromagnetic sources focused on a targeted predetermined electronic component to amplify said characteristic signal.

29. A measuring apparatus, according to claim 22, wherein at least one of said receiver and said emitter means is disposed for aerial surveillance.

30. A method for locating predetermined electronic equipment, said method comprising the steps of:
(a) providing a receiver for measuring an unintentional electromagnetic emissions signature and an intentional electromagnetic signature of a targeted electronic device for locating said predetermined electronic equipment;
(b) providing an emitter means for providing an amplified electromagnetic energy for locating said predetermined electronic equipment; and
(c) at least one of amplifying at least one of said unintentional and an intentional electromagnetic emissions signature of such targeted electronic device by using an applied electromagnetic field generated by said emitter means and at least one of shifting a frequency and changing a frequency content of said at least one of said unintentional and intentional electromagnetic emissions signature for locating said predetermined electronic equipment.

31. The method, according to claim 30, wherein said method includes the additional step of causing such targeted electronic device to emit electromagnetic radiation which enables at least one of better tracking, locating, eavesdropping and causing failure of such electronic device.

32. The method, according to claim 30, wherein said method includes the additional step of using RF energy from at least one of an RF and a microwave source for enhancing ability to establish characteristics of an emissions source in conjunction with an active high power RF that drives emission signature changes.

33. The method, according to claim 30, wherein said method includes the additional step of causing changes in emission signatures in order to impact remotely such targeted electronic device.

34. The method, according to claim 30, wherein said method includes the additional step of measuring a level of field strength necessary to impact such targeted electronic device for use in deciding to use other assets to learn more about said emitter.

35. The method, according to claim 30, wherein said method includes the additional step of tuning source of such emission signatures of such targeted electronic device to enable measuring a relative distance of such targeted electronic device from at least one of said receiver and such source.

36. The method, according to claim 30, wherein said method includes the additional step of measuring a direction of such emission signatures of such targeted electronic device by sweeping such source across at least one of a number of degrees and radians for measuring a direction of such targeted electronic device from at least one of said receiver and such source.

37. The method, according to claim 30, wherein said method includes the additional step of rapidly transforming a source of such characteristic signature into a relatively robust emitter to aid in at least one of tracking and locating such targeted electronic device.

38. The method, according to claim 30, wherein said method includes at least one of the additional steps of using integrated passive emission collection techniques and at least one of offensive RF weapons, radar and jammers for at least one of locating and tracking individuals dependant on predetermined electronic devices.

39. The method, according to claim 30, wherein said method includes the additional steps of cataloging in a database at least one of specific degradation signatures of different types of equipment and circuit components failure signatures and comparing such equipment signature change for at least one of locating and tracking such equipment.

40. The method, according to claim 30, wherein step (c) includes measuring an unintentional electromagnetic radiation of such targeted electronic device and directing electromagnetic energy at such targeted electronic device at tunable levels in order to locate such targeted electronic device over a wide beam width.

41. The method, according to claim 40, wherein said method includes the additional step of causing at least one of incrementally more degradation and failure of such targeted electronic device.

42. The method, according to claim 30, wherein said method includes the additional step of permanently altering at least one of an amplitude and a frequency characteristic of such unintentional electromagnetic emissions signature such that such electronic equipment is at least one of tagged and identified for future inspection.

43. The method, according to claim 30, wherein said method includes the additional step of tuning said emitter to a non specific frequency and using said emitter for generating Cross Modulation Products in a targeted electronic device which enables at least one of better tracking, identifying and locating of such targeted electronic device.

44. The method, according to claim 30, wherein said method includes the additional step of tuning said emitter specifically to a specific frequency that is emitted from said targeted device which results in shifts in a frequency of emissions of a specific board mounted device in a targeted electronic device by greater than 5 Hz for enabling at least one of better tracking, locating, identifying and eavesdropping of such targeted device.

* * * * *